(12) United States Patent
Kanai

(10) Patent No.: US 8,677,265 B2
(45) Date of Patent: Mar. 18, 2014

(54) APPLICATION PROGRAM AND IMAGE PROCESSING APPARATUS

(75) Inventor: Kunio Kanai, Tokyo (JP)

(73) Assignee: Oki Data Corporation, Tokyo (JP)

( * ) Notice: Subject to any disclaimer, the term of this patent is extended or adjusted under 35 U.S.C. 154(b) by 364 days.

(21) Appl. No.: 12/700,840

(22) Filed: Feb. 5, 2010

(65) Prior Publication Data

US 2010/0211906 A1 Aug. 19, 2010

(30) Foreign Application Priority Data

Feb. 19, 2009 (JP) ................................ 2009-036461

(51) Int. Cl.
G06F 3/048 (2013.01)

(52) U.S. Cl.
USPC ............................ 715/795; 715/759; 715/803

(58) Field of Classification Search
USPC .................. 715/779, 788, 772, 768, 781, 759
See application file for complete search history.

(56) References Cited

U.S. PATENT DOCUMENTS

| | | | | |
|---|---|---|---|---|
| 5,390,295 | A * | 2/1995 | Bates et al. .................... | 715/789 |
| 6,600,500 | B1 * | 7/2003 | Yamamoto ..................... | 715/795 |
| 7,581,192 | B2 * | 8/2009 | Stabb et al. .................... | 715/781 |
| 2003/0142139 | A1 * | 7/2003 | Brown et al. ................... | 345/800 |
| 2004/0001101 | A1 * | 1/2004 | Trajkovic et al. ............. | 345/781 |
| 2005/0246659 | A1 * | 11/2005 | Mengerink et al. ........... | 715/808 |
| 2005/0254775 | A1 * | 11/2005 | Hamilton et al. .............. | 386/46 |
| 2006/0069785 | A1 * | 3/2006 | Barrett ........................... | 709/229 |
| 2006/0123353 | A1 * | 6/2006 | Matthews et al. ............. | 715/779 |
| 2006/0248471 | A1 * | 11/2006 | Lindsay et al. ................ | 715/800 |
| 2006/0271862 | A1 * | 11/2006 | Carey et al. .................... | 715/762 |
| 2007/0180398 | A1 * | 8/2007 | McArdle ......................... | 715/781 |
| 2007/0192733 | A1 * | 8/2007 | Horiuchi ......................... | 715/788 |
| 2007/0226644 | A1 * | 9/2007 | Bradfield ........................ | 715/781 |
| 2008/0052742 | A1 * | 2/2008 | Kopf et al. ....................... | 725/34 |
| 2008/0172617 | A1 * | 7/2008 | Takeda et al. .................. | 715/733 |
| 2009/0031243 | A1 * | 1/2009 | Kano et al. ..................... | 715/781 |
| 2009/0125839 | A1 * | 5/2009 | Kano et al. ..................... | 715/788 |
| 2009/0183107 | A1 * | 7/2009 | Matthews et al. ............. | 715/781 |
| 2010/0077338 | A1 * | 3/2010 | Matthews et al. ............. | 715/779 |

FOREIGN PATENT DOCUMENTS

| | | | | |
|---|---|---|---|---|
| JP | 05250126 | A * | 9/1993 | ............... G06F 3/14 |
| JP | 2002-091418 | A | 3/2002 | |
| JP | 2002-099369 | A | 4/2002 | |
| JP | 2002-297279 | A | 10/2002 | |

(Continued)

OTHER PUBLICATIONS http://www.forest.impress.co.jp/article/2002/11/21/alltotray.html (3 pages).

(Continued)

Primary Examiner — Tuyetlien Tran
Assistant Examiner — Abimbola Ayeni
(74) Attorney, Agent, or Firm — Panitch Schwarze Belisario & Nadel LLP

(57) ABSTRACT

An application program capable of operating on a prescribed operating system includes a plurality of functional processing units, a window processing unit allowing a window corresponding to any of the functional processing units operated in a case where any of the plural functional processing units is operated, a minimization unit minimizing the window, and a setting selection unit selecting setting information for the minimization. The minimization unit minimizes the window based on the setting information selected by the setting selection unit, and the setting selection unit is capable of selecting the setting information with respect to each of the plural functional processing units.

12 Claims, 13 Drawing Sheets

(56) References Cited

FOREIGN PATENT DOCUMENTS

| | | |
|---|---|---|
| JP | 2004-151858 A | 5/2004 |
| JP | 2005-011032 A | 1/2005 |
| JP | 2005-122312 A | 5/2005 |

OTHER PUBLICATIONS http://www.forest.impress.co.jp/article/2002/11/21/alltotray.html translation only, 1 page.
XKEYMACS, http://www.cam.hi-ho.ne.jp/oishi/, © 2001-2007, 2 pages.

\* cited by examiner

APPLICATION PROGRAM AND IMAGE PROCESSING APPARATUS

BACKGROUND OF THE INVENTION

1. Field of the Invention

The present invention relates to an application program and an image processing apparatus operating on a prescribed operating system.

2. Description of Related Art

A related art information processing apparatus is capable of allowing a plurality of applications to operate in an operating system environment. For example, FIG. 13 illustrates an example display screen 900 showing a case where the plural applications operate under the operating system including a WINDOWS (trademark) based graphical user interface (hereafter referred to as GUI). The screen 900 includes a task bar 904 and a system tray 905 on a lower side thereof. Each of windows 901 includes a title bar 902 having a minimization button 903. In a case where the minimization button 903 is clicked, the application performs a minimization process. FIG. 14 illustrates an example display screen 950 showing a case where the windows for the respective applications are minimized by a prescribed minimization process. The minimized windows for the respective applications can be stored in a task bar 951 or a system tray 952.

For example, Patent Document 1 discloses the technology relating to a window control program allowing a user to optionally set a display shape and a display position of a window in operation using a minimization button and/or maximization button in a computer environment capable of using a plurality of applications on the operating system of the WINDOWS (trademark) based GUI.

Japanese Patent No. 3965927

According to one application having plural functions, the minimization method is set with respect to the application although an appropriate minimization method may vary depending on the function in operation. Consequently, the minimization method with respect to one particular application can be unique, causing an increase in likelihood of not performing the appropriate minimization method for the function in operation.

The present invention is proposed in consideration of the aforementioned situations, and provides an application program and an image processing apparatus capable of effectively operating in an environment running a plurality of functions, or namely a multi-task environment, by setting a minimization method, a restoration method, and a maximization method for a window with respect to each function.

BRIEF SUMMARY OF THE INVENTION

According to an aspect of the present invention, an application program capable of operating on a prescribed operating system includes: a plurality of functional processing units; a window processing unit allowing a window corresponding to any of the functional processing units operated in a case where any of the plural functional processing units is operated; a minimization unit minimizing the window; and a setting selection unit selecting setting information for the minimization. The minimization unit minimizes the window based on the setting information selected by the setting selection unit, and the setting selection unit is capable of selecting the setting information with respect to each of the plural functional processing units.

According to another aspect of the present invention, an image processing apparatus, capable of operating based on an application program operating on a prescribed operating system, includes a control unit. Based on the application program, the control unit functions as a plurality of functional processing units, a window processing unit allowing a window corresponding to any of the functional processing units operated in a case where any of the plural functional processing units is operated, a minimization unit minimizing the window, and a setting selection unit capable of selecting setting information for the minimization. The minimization unit minimizes the window based on the setting information selected by the setting selection unit, and the setting selection unit is capable of selecting the setting information with respect to each of the plural functional processing units.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the present invention and many of the attendant advantage thereof will be readily obtained as the same becomes better understood by reference to the following detailed description when considered in connection with the accompanying drawings, wherein.

DETAILED DESCRIPTION OF PREFERRED EMBODIMENTS

Figure 1:
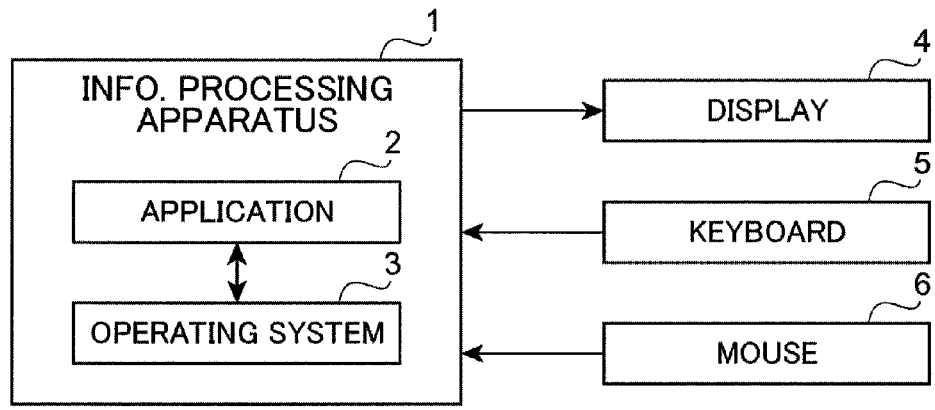
FIG. 1 is a schematic block diagram illustrating an information processing apparatus according to a first embodiment of the present invention and peripheral devices thereof.

An application program and an image processing apparatus according to preferred embodiments of the present invention are now described more fully hereinafter with reference to the accompanying drawings. The present invention may, however, be embodied in many different forms and should not be construed as limited to the embodiments set forth herein. The embodiments, therefore, may be modified or varied without departing from the scope of the present invention.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner. Preferred embodiments of the present invention are described in detail referring to the drawings, wherein like reference numerals designate identical or corresponding parts throughout the several views.

The embodiments of the present invention allow a minimization method, a restoration method of restoring from minimization, and a maximization method to be set for operation of a window with respect to each function of an application in a case where a plurality of applications operate in an operating system environment including a WINDOWS (trademark) based graphical user interface (GUI), so that the window is operated according to the prescribed methods for the minimization period, the restoration period from minimization, and the maximization period.

According to the embodiments of the present invention, therefore, the minimization method, the restoration method, and the maximization method are set for operation of the window with respect to each function of the application, so that a user can enjoy effective operation in an environment running the plural applications, or namely a multi-task environment. Each of the first and second embodiments of the present invention is described below.

First Embodiment

An application program 2 and an information processing apparatus 1 according to the first embodiment of the present invention are described with reference to FIG. 1 through FIG. 8. The application program 2 includes functions of setting printer information, monitoring a printer state, and transmitting data to the printer. The application program 2 is, for example, Word (trademark) and Excel (trademark). The information processing apparatus 1 is, for example, a personal computer.

Referring to FIG. 1, the information processing apparatus 1 according to the first embodiment and peripheral devices thereof are illustrated in a schematic block diagram. The information processing apparatus 1 is, for example, connected with a display 4, a keyboard 5, and mouse 6. The information processing apparatus 1 includes an operating system 3 and the application program 2 installed therein. The operating system 3 includes a function of graphical user interface (hereafter referred to as GUI), and the application program 2 operates on the operating system 3.

The information processing apparatus 1 includes the operating system 3 having functions of: receiving an input from an input device such as the keyboard 5 or the mouse 6 to generate an event with respect to the input; processing the event thereby; and notifying the application program 2 of the event. The operating system 3 also has a function of allowing a result, for example, a notification result from the application program 2 or a process result performed thereby, to be output on the display 4.

Figure 2:
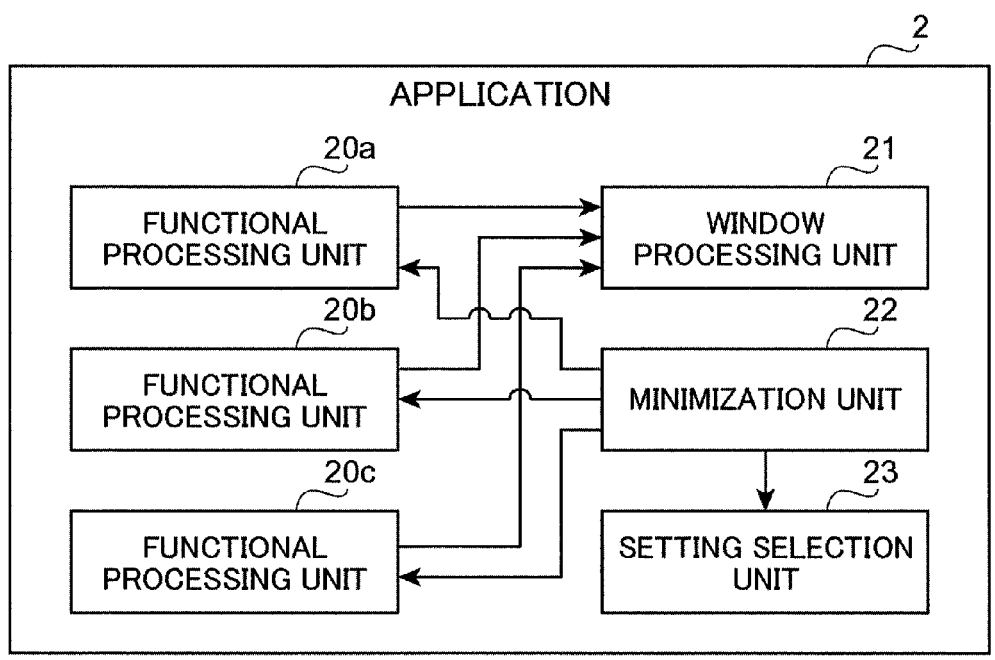
FIG. 2 is a schematic block diagram illustrating functions of an application program included in the information processing apparatus of FIG. 1.

The application program 2 in FIG. 1 includes the functions as illustrated in a schematic block diagram in FIG. 2. The application program 2 includes: functional processing units 20a, 20b, 20c; window processing unit 21; a minimization unit 22; and a setting selection unit 23. Each of the functional processing units 20a, 20b, 20c includes a function of performing a main process for the application program 2. According to the first embodiment, the functional processing unit 20a sets the printer information; the functional processing unit 20b monitors the printer state; and the functional processing unit 20c transmits the data to the printer. However, each of the functional processing units 20a, 20b, 20c is not limited thereto.

Figure 6:
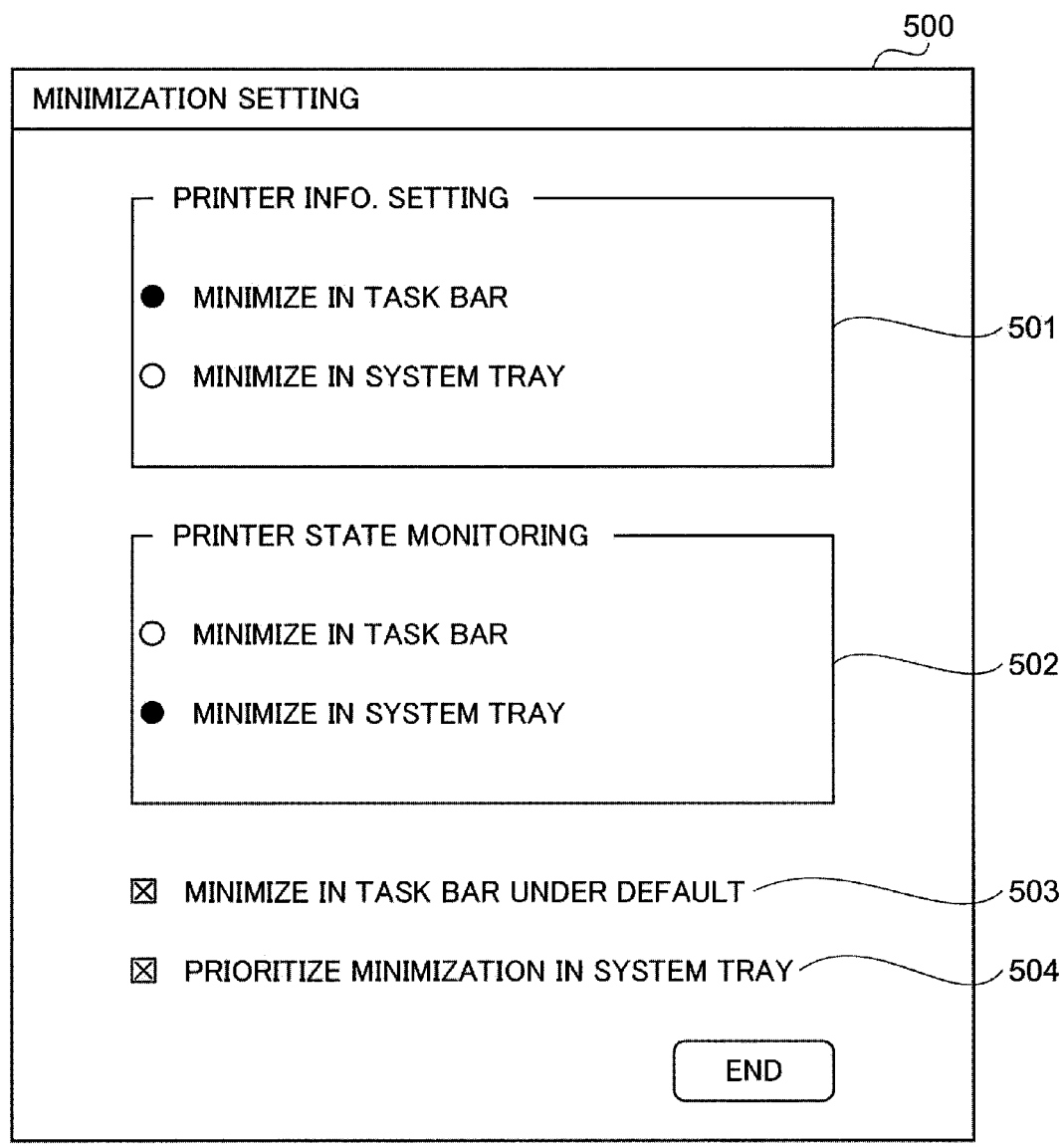
FIG. 6 is a schematic diagram illustrating an example display screen for application setting.

The window processing unit 21 includes a function of allowing the window with respect to the functional processing units 20a, 20b, 20c being operated to be displayed on the display 4 through the operating system 3. The minimization unit 22 includes a function of performing a minimization process in response to a window minimization event notified from the operating system 3. The setting selection unit 23 includes a function of allowing a setting screen 500 as illustrated in FIG. 6 to be displayed on the display 4 to facilitate the user to input the setting information. The setting screen 500, for example, allows the functional processing units 20a, 20b, 20c and respective minimization methods to be linked. The setting selection unit 23 includes a function of storing the setting information input through the setting screen 500.

Figure 3:
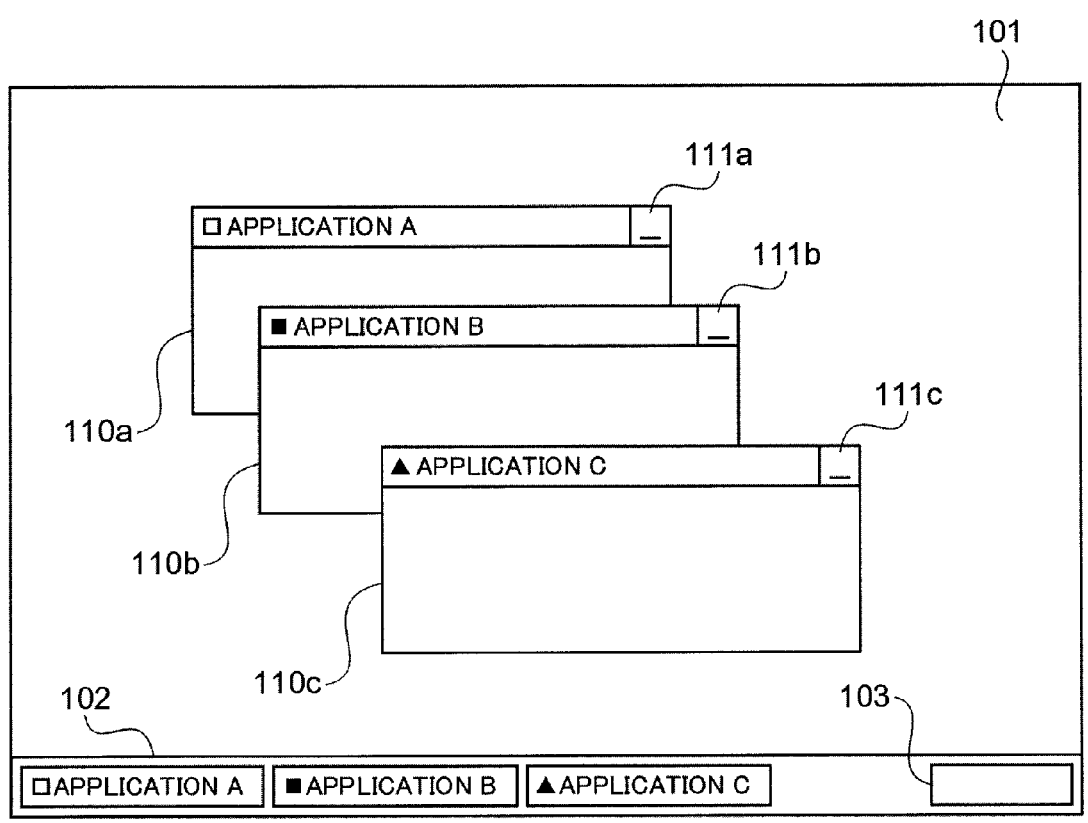
FIG. 3 is a schematic diagram illustrating an example display screen showing an operating system environment including a window-based graphical user interface (GUI)

Referring to FIG. 3, an example display screen 101 showing an operating system environment having a WINDOWS (trademark) based GUI is illustrated. The screen 101 displays application display regions 110a, 110b, 110c, a task bar 102, and a system tray 103 thereon. Each of the application display regions 110a, 110b, 110c displays a running application. In the screen 101, for example, applications A, B, C are running and are displayed on the application display regions 110a, 110b, 110c, respectively. The task bar 102 displays window information of respective running applications thereon. Moreover, the task bar 102 displays minimized application information thereon. The system tray 103 displays an icon of the application to be stored therein.

Figure 4:
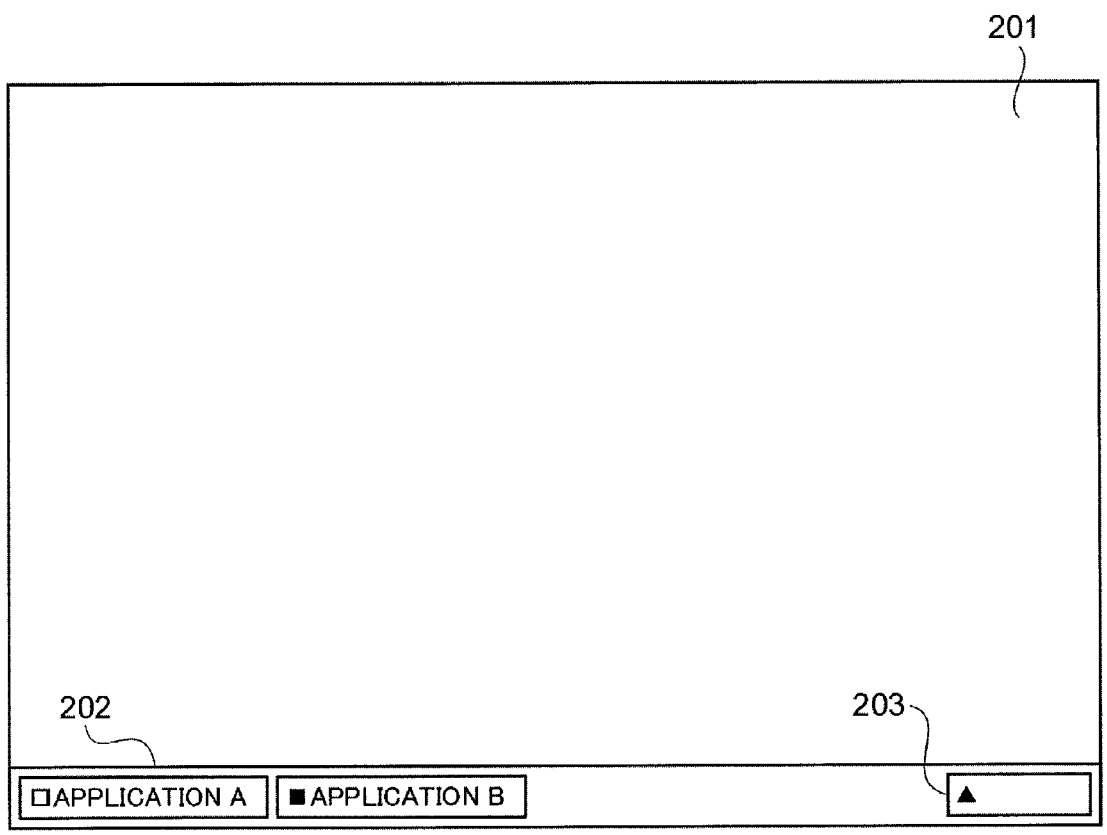
FIG. 4 is a schematic diagram illustrating an example display screen in a case where a minimization process is performed.

The application display regions 110a, 110b, 110c for the respective applications A, B, C include minimization buttons 111a, 111b, 111c respectively provided in upper portions of the windows thereof. The minimization buttons 111a, 111b, 111c are clicked by the user, so that the applications A, B, C are displayed in a minimized manner. For example, in a case where one of the minimization buttons 111a, 111b, 111c is clicked, the operating system 3 notifies the application program 2 of the minimization event. The application program 2 executes the minimization process in response to the minimization event. For example, in a case where the application program 2 performs a prescribed minimization process, the applications such as the applications A, B are displayed in a task bar 202 of a screen 201 as illustrated in FIG. 4. On the other hand, in a case where the application program 2 performs another minimization process storing the application in a system tray 203 in response to the minimization event, the icon of the application, for example, the application C, can be displayed in the system tray 203.

Figure 5A:
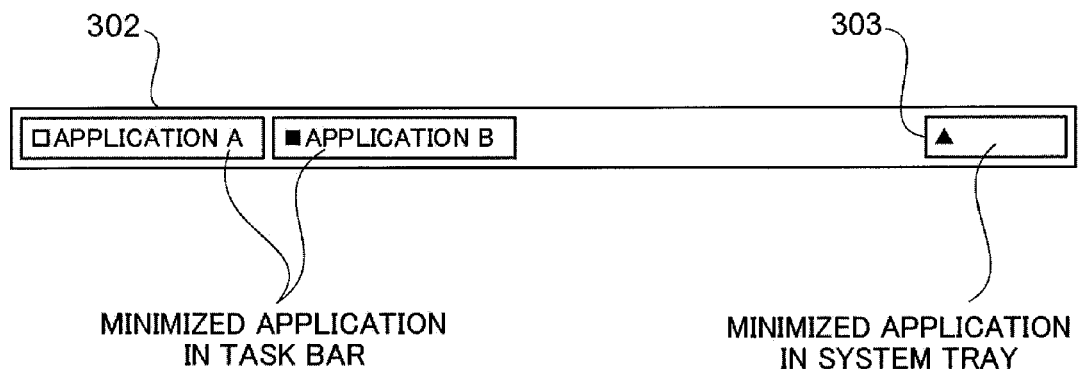
FIG. 5A is a schematic diagram illustrating an example display of minimized applications.
Figure 5B:
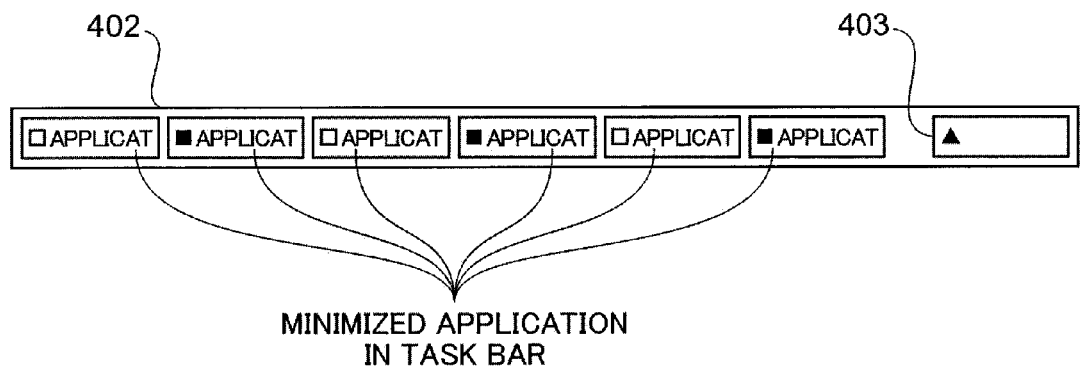
FIG. 5B is a schematic diagram illustrating another example display of the minimized applications.

Referring to each of display examples of FIGS. 5A, 5B, the applications are minimized in a task bar and a system tray. For example, the display example of FIG. 5A includes the task bar 302 and the system tray 303. The display example of FIG. 5B includes the task bar 402 and the system tray 403.

In a case where the applications are minimized in the task bar 302 as illustrated in FIG. 5A, the icons and application names are visibly displayed in the task bar 302, that is, visibility thereof is good. However, since the task bar 302 has a limitation in length, the visibility of the icon and application name can be deteriorated as an increase in the number of applications.

That is, the greater the number of the applications, the smaller the amount of the information per application in the task bar. For example, the information amount per application is small in the example display of FIG. 5B, causing deterioration of the visibility in the task bar 402. Accordingly, the applications are not preferably minimized for prolong time in the task bar 402. The minimized application in the system tray 403, on the other hand, is displayed in the form of the icon only, and the visibility is not good. However, since the system tray 403 has a fixed length, the visibility of the applications minimized in the task bar 402 is not influenced by the application or applications minimized in the system tray 403.

Referring to FIG. 6, the setting screen 500 serving as an example display screen for application setting is illustrated. The setting screen 500 includes: a minimization selection button 501 used to minimize the function of setting the printer information; a minimization selection button 502 used to minimize the function of monitoring the printer state; a prescribed minimization determination button 503; and a priority minimization determination button 504.

Each of the minimization selection buttons 501, 502 allows the minimization method with respect to the function in operation to be designated. A function, operating for prolong time while being minimized, is preferably minimized in the system tray in consideration of the influence to other applications. For example, the function of monitoring the printer state is operated for the prolong time while being minimized. Accordingly, the function of monitoring the printer state is set using the minimization selection button 502 in such a manner as to be minimized in the system tray in a case of being in operation. The prescribed minimization determination button 503 allows a prescribed value for the minimization method to be designated. The prescribed value, for example, is a default setting. The prescribed value can be used for a function for which a minimization method cannot be designated, that is, a minimization method for the function of transmitting the data to the printer. Moreover, the prescribed value can be used in a case where no function is in operation. The priority minimization determination button 504 allows a minimization method to be prioritized over other minimization methods in a case where not only the plural functions are in operation, but also the minimization methods for the respective functions are different. According to the display example of the setting screen 500 in FIG. 6, the minimization methods for the function of setting the printer information and the function of monitoring the printer state are different from each other in a case where the respective functions are in operation. However, the priority minimization determination button 504 allows the minimization method in the system tray to be prioritized as illustrated in the setting screen in FIG. 6.

Figure 7:
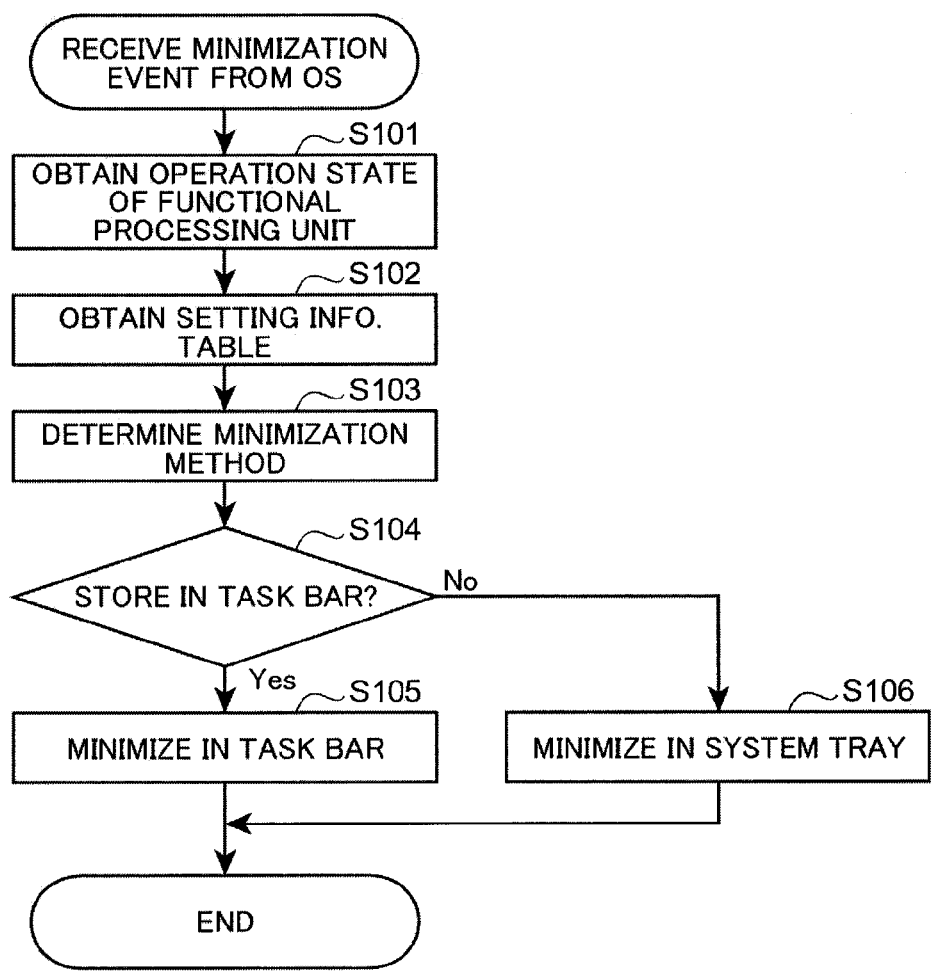
FIG. 7 is a flowchart illustrating an example operating procedure of the information processing apparatus according to the first embodiment of the present invention.

Referring to a flowchart in FIG. 7, a description is given of an example operating procedure of the information processing apparatus 1 according to the first embodiment of the present invention. The flowchart. 7 corresponds to an example procedure of the application program 2.

The minimization unit 22 begins the process upon receiving the minimization event of the operating system 3. The minimization unit 22 queries each of the functional processing units 20a, 20b, 20c regarding the operation state thereof, and obtains the operating state whether or not each of the functional processing units 20a, 20b, 20c is in operation or not in operation upon receiving the minimization event of the operating system 3 (step S101). Subsequently, the minimization unit 22 obtains the setting information from the setting selection unit 23 (step S102). Herein, the setting information is, for example, in the form of a setting information table. The minimization unit 22 determines the minimization methods based on the operation states of the respective functional processing units 20a, 20b, 20c and the setting information (step S103). The determination of the minimization method in step S103 will be described in detail with reference to a flowchart in FIG. 8.

The minimization unit 22 minimizes the window according to the minimization method determined (step S104 through step S106). Particularly, the minimization unit 22 determines whether or not the window is to be stored in the task bar (step S104). Where the minimization unit 22 determines to store the window in the task bar (Yes in step S104), the window is stored in the task bar, that is, the window is minimized in the task bar (step S105), and a series of the processes ends. Where the minimization unit 22 determines not to store the window in the task bar (No in step S104), on the other hand, the window is stored in the system tray, that is, the window is minimized in the system tray (step S106), and a series of the processes ends.

Figure 8:
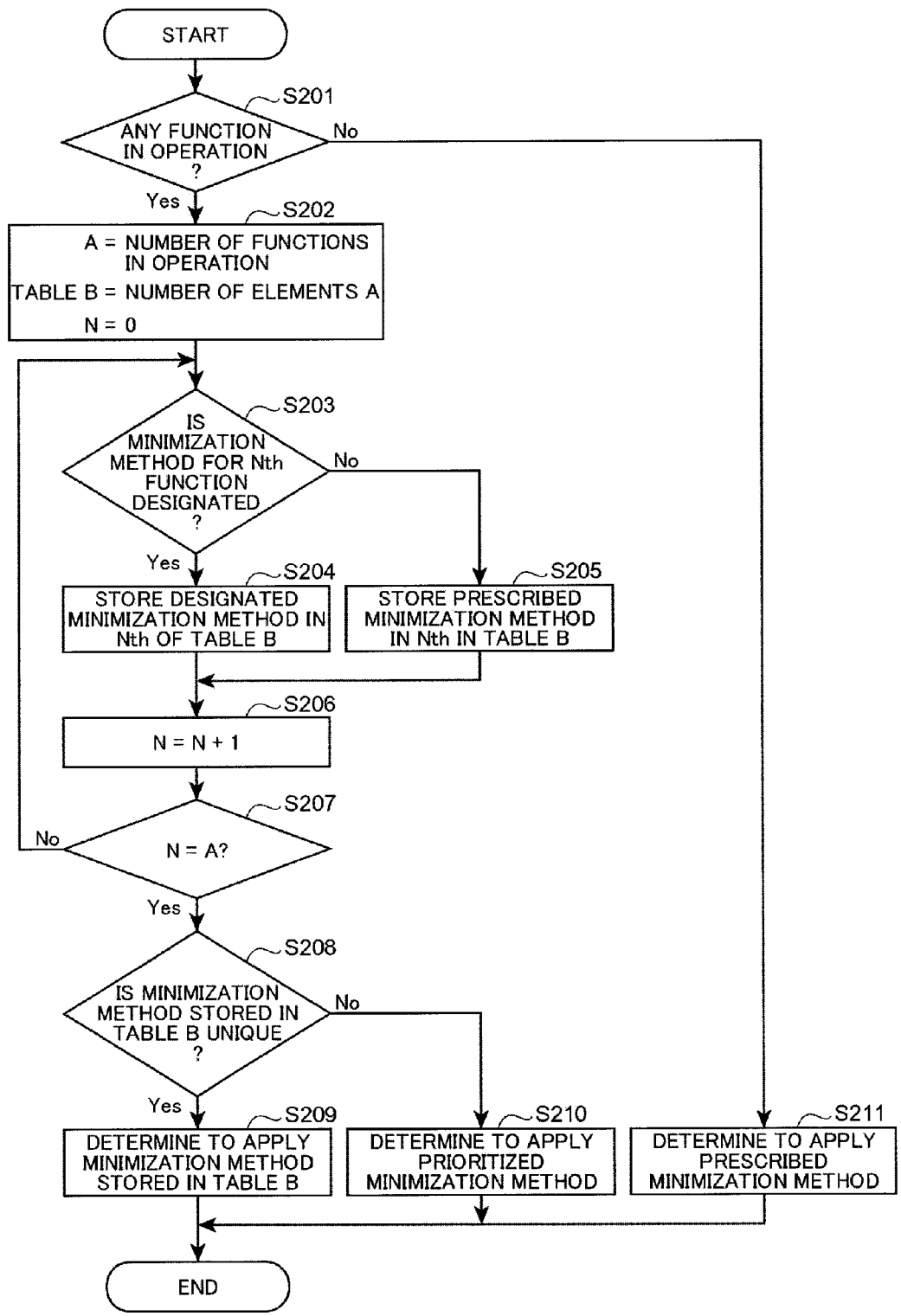
FIG. 8 is a flowchart illustrating an example detailed procedure for minimization method determination in step S103 of the flowchart in FIG. 7.

Referring to the flowchart in FIG. 8, a detailed description is given of an example determination procedure for the minimization method in step S103 of the flowchart in FIG. 7.

The minimization unit 22 checks whether or not there is any function in operation based on the operation state obtained in step S101 of flowchart in FIG. 7 (step S201). Where there is no function in operation (No in step S201), the minimization unit 22 performs the prescribed minimization method (step S211), and a series of the processes ends. Where there is any function in operation (Yes in step S201), on the other hand, the minimization unit 22 searches the number of function or functions in operation and creates a table storing the minimization methods having the number of elements substantially equal to the number of functions in operation searched (step S202). Subsequently, the minimization unit 22 sequentially searches each of the functions in operation and determines whether or not the minimization methods for the respective functions are designated (step S203). Where the minimization method is designated (Yes in step S203), the minimization unit 22 stores the minimization method in the table (step S204). Where the minimization method is not designated (No in step S203), on the other hand, the minimization unit 22 stores the prescribed minimization method in the table (step S205). The minimization unit 22 performs step S204 and step S205 with respect to all functions in operation (e.g., the number of functions is N) and completes the creation of the table storing the minimization methods (step S203 through step S207). Subsequently, the minimization unit 22 determines whether or not the minimization method stored in the table is unique (step S208). Where the minimization method is unique (Yes in step 208), the minimization unit 22 determines to apply the minimization method stored in the table (step S209), and a series of the processes ends. Where the minimization method is not unique (No in step 208), the minimization unit 22 determines to apply the minimization method to be prioritized (step S210), and a series of the processes ends.

According the first embodiment of the present invention described above, the information processing apparatus includes the application program 2 capable of operating on the prescribed operating system 3. The application program 2 includes: the plural functional processing units 20a, 20b, 20c; the window processing unit 21 allowing the window with respect to the functional processing units operated to be open on the operating system 3 in a case where any of the functional processing units 20a, 20b, 20c is operated; the minimization unit 22 minimizing the window; and the setting selection unit 23 selecting the setting information for the minimization. The minimization unit 22 minimizes the window based on the setting information selected by the setting selection unit 23. The setting selection unit 23 is capable of selecting the setting information with respect each of the functional processing units 20a, 20b, 20c.

The first embodiment of the present invention, therefore, provides the minimization method with respect to each of the functions in operation, so that an appropriate minimization method can be applied with respect to the function in operation. According to the first embodiment, the functional processing units 20a, 20b, 20c and the minimization methods are linked using the setting screen 500. However, the functional processing units 20a, 20b, 20c and the minimization methods may be linked one another inside the application program 2. Moreover, the information processing apparatus 1 according to the first embodiment of the present invention can be applied to an image processing apparatus.

Second Embodiment

Figure 9:
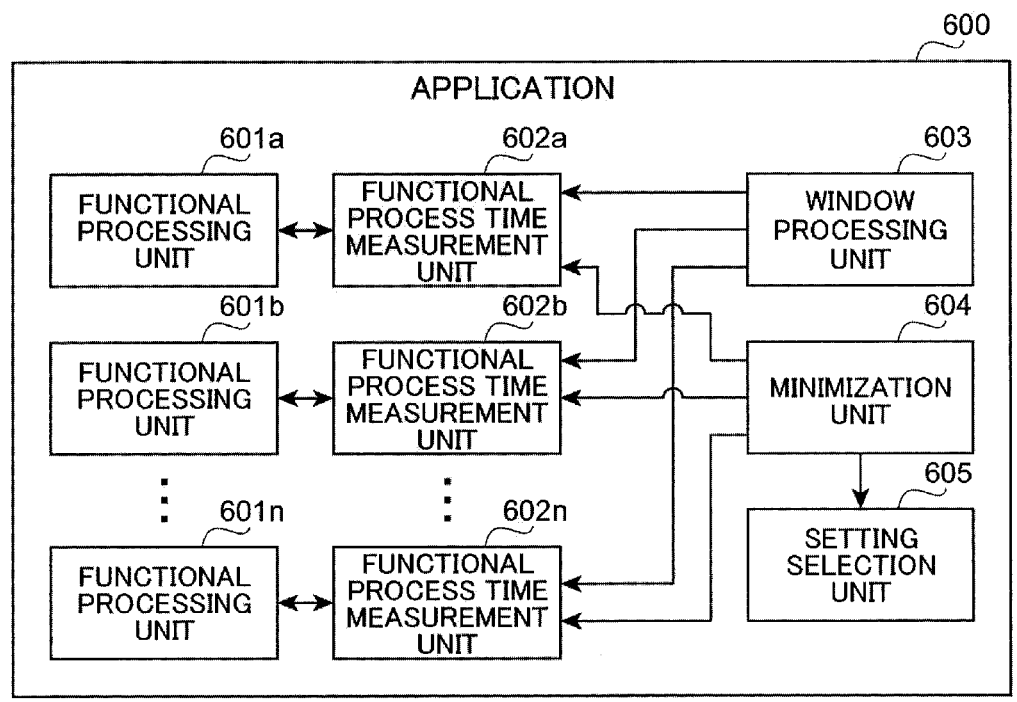
FIG. 9 is a schematic block diagram illustrating functions of an application program according to a second embodiment of the present invention.
Figure 10:
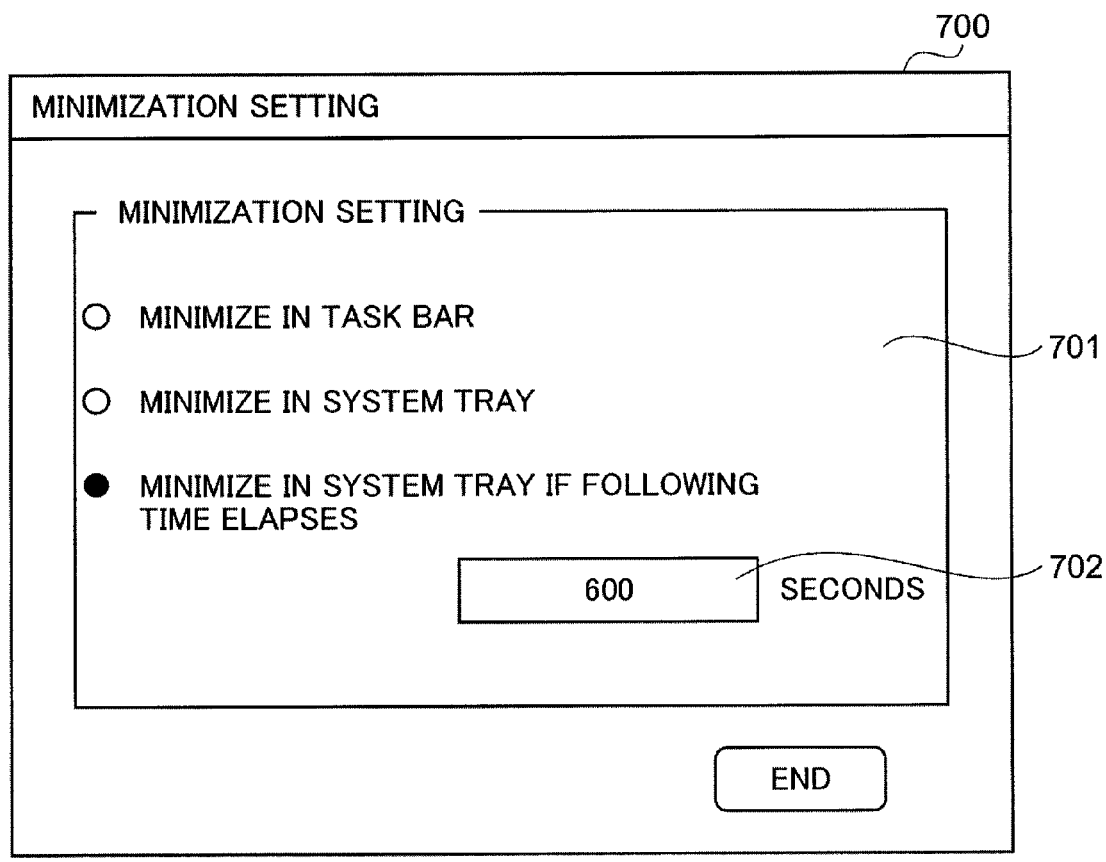
FIG. 10 is a schematic diagram illustrating an example display screen for application setting.
Figure 11:
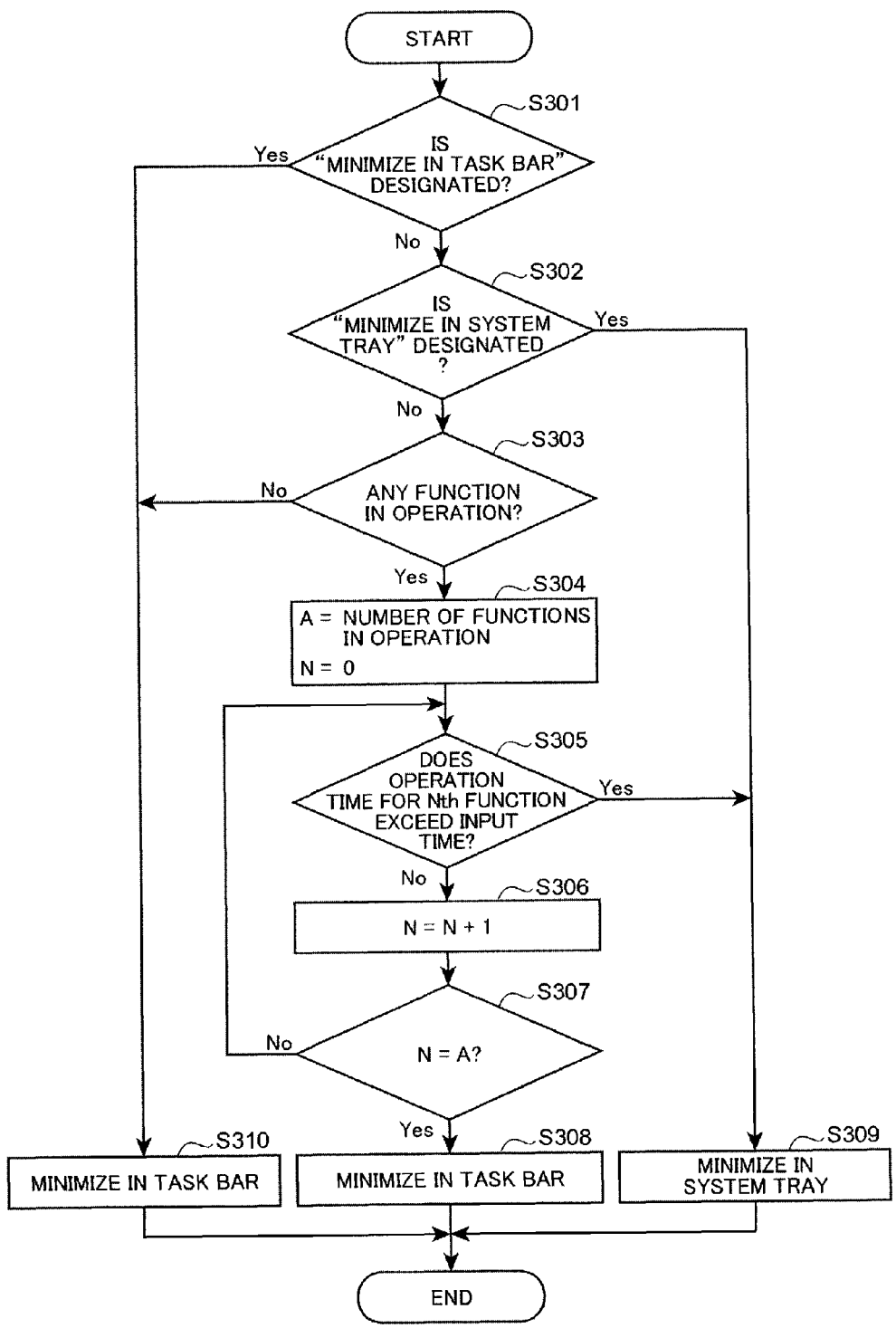
FIG. 11 is a flowchart illustrating an example detailed procedure for a minimization method determination by the application program according to the second embodiment of the present invention.

Referring to FIG. 9 through FIG. 11, a description is given of an application program 600 according to a second embodiment. The application program 600 includes: a function of setting printer information; a function of monitoring the printer state; and a function of transmitting data to the printer. The application program 600 is installed in an information processing apparatus that is substantially similar to the information processing apparatus 1 of the first embodiment except for the application program 600. Only components and configurations of the information processing apparatus that differ from those of the above embodiment will be described, and like components will be given the same reference numerals as above while a description thereof will be omitted for the sake of simplicity.

Referring to FIG. 9, the application program 600 according to the second embodiment of the present invention is illustrated in a block diagram. The application program 600 includes: a plurality of functional processing units 601a through 601n; a plurality of functional process time measurement units 602a through 602n; a minimization unit 604; and a setting selection unit 605. According to the second embodiment of the present invention, the plural functional processing units and the plural functional process time measurement units are provided (e.g., the number of units is N) with respect to a plurality of processing functions.

Each of the functional processing units 601a through 601n includes a function of performing a main process for the application program 600. According to the second embodiment of the present invention, the application program 600 includes: the functional processing unit 601a setting printer information; the functional processing unit 601b monitoring the printer state; and the functional processing unit 601n transmitting data to the printer. Each of the functional process time measurement units 602a through 602n includes a function of measuring the time elapsed from beginning of the process performed by the respective functional processing units 601a through 601n.

The functional processing units 601a through 601n notify the respective functional process time measurement units 602a through 602n at the time of the beginning of the process and at the time of the end of the process thereof. Each of the functional process time measurement units 602a through 602n resets a measurement time with respect to each measurement. The window processing unit 603 includes a function of displaying the window corresponding to each of the functional processing units 601a through 601n in operation to be displayed on a display 4 through an operating system 3. The minimization unit 604 includes a function of performing a minimization process of an application in response to a window minimization event notified from the operating system 3.

The setting selection unit 605 includes a function of allowing a setting screen 700 (described later) as illustrated in FIG. 10 to be displayed on the display 4 to receive an input of the setting information. The setting screen 700, for example, allows the time elapsed from the beginning of the operation of the functional processing units 601a through 601n and respective minimization methods to be linked. The setting selection unit 605 also includes a function of storing the setting information input through the setting screen 700.

FIG. 10 shows an example display screen of the setting screen 700 for the application setting. As shown in FIG. 10, the setting screen 700 includes a minimization selection button 701 and a time input box 702. The minimization selection button 701 allows the minimization method to be designated. For example, the minimization button 701 includes three options "MINIMIZE IN TASK BAR," "MINIMIZE IN SYSTEM TRAY," and "MINIMIZE IN SYSTEM TRAY IF FOLLOWING TIME ELAPSES" to select from. In a case where the "MINIMIZE IN SYSTEM TRAY IF FOLLOWING TIME ELAPSES" in the selection button 701 is selected, the window is minimized in the system tray when the elapsed time for the function in operation exceeds the time input in the time input box 702, and the window is minimized in the task bar when the elapsed time for the function in operation does not exceed the time input in the time input box 702.

Referring to a flowchart in FIG. 11, a description is now given of an example determination procedure for the minimization method according to the second embodiment of the present invention. Herein, the determination procedure is described using the setting information input through the setting screen 700 in FIG. 10 as an example. The operation of the information processing apparatus according to the second embodiment of the present invention is substantially similar to the information processing apparatus 1 of the first embodiment of the present invention, and the description thereof is omitted for the sake of simplicity.

The minimization unit 604 determines whether or not the "MINIMIZE IN TASK BAR" is designated in the setting screen 700 in FIG. 10 based on the setting information (step S301). Where the "MINIMIZE IN TASK BAR" is designated (Yes in step S301), the minimization unit 604 minimizes the window in the task bar (step S310), and the process ends.

Where the "MINIMIZE IN TASK BAR" is designated (No in step S301), the minimization unit 604 determines whether or not the "MINIMIZE IN SYSTEM TRAY" is designated based on the setting information (step S302). Where the "MINIMIZE IN SYSTEM TRAY" is designated (Yes in step S302), the minimization unit 604 minimizes the window in the system tray (step S309), and the process ends.

Where the "MINIMIZE IN SYSTEM TRAY" is not designated (No in step S302), on the other hand, the minimization unit 604 determines whether or not there is any function in operation (step S303). Where there is no function in operation (No in step S303), the minimization unit 604 minimizes the window in the task bar (step S310), and the process ends. Where there is any function in operation (Yes in step S303), on the other hand, the minimization unit 604 searches the number of the functions in operation (step S304).

Subsequently, the minimization unit 604 obtains the operation times of the respective functions in operation from the respective functional process time measurement units 602a through 602n and determines whether or not the operation time elapsed for the function in operation exceeds the time input in the time input box 702 of the setting screen 700 (step S305). Where the operation time exceeds the time input in the input box 702 (Yes in step S305), the minimization unit 604 minimizes the window in the system tray (step S309), and the process ends. Where the operation time does not exceed the time input in the input box 702 (No in step S305), the flow proceeds to step S306 and step S307. The minimization unit 604 performs step S305 with respect to all of the functions in operation including, for example, the function of setting the printer information, the function of monitoring the printer state, and the function of transmitting the data to the printer. However, the functions are not limited thereto. Where the elapsed times for all of the functions in operation are less than the time input in the time input box 702, the minimization unit 604 minimizes the window in the task bar (step S308), and the process ends.

According to the second embodiment of the present invention, therefore, the application program 600 operates on the prescribed operating system 3 and includes: the plural functional processing units 601a through 601n; the plural functional process time measurement units 602a through 602n measuring the time from the beginning of the operation to the end of the operation of the respective functional processing units 601a through 601n; the window processing unit 603 allowing the window with respect to the functional processing units 601a through 601n operated to be open on the operating system 3 in a case where any of the functional processing units 601a through 601n is operated; the minimization unit 604 minimizing the window; and the setting selection unit 605 capable of selecting the setting information for the minimization. The minimization unit 604 minimizes the window based on the setting information selected using the setting selection unit 605. The setting selection unit 605 can also allow the screen as illustrated in FIG. 10 to be displayed to receive the input of a threshold time to change the minimization method. The minimization unit 604 minimizes the window based on the threshold time input using the setting selection unit 605 and the operation times of the functional processing units 601a through 601n measured by the respective functional process time measurement units 602a through 602n.

According to the second embodiment of the present invention, the operation time is measured with respect to each of the functions in operation, thereby minimizing the window according to the operation time.

According to the second embodiment of the present invention, the time (i.e., the threshold time) to change the minimization method is set with respect to all of the functions based on the operation time elapsed from the beginning of the operation. However, the threshold time to change the minimization method can be set with respect to each of the functions. According to the second embodiment of the present invention, the setting screen 700 including the minimization method and the threshold time to change the minimization method are illustrated. However, the minimization method and the threshold time can be set inside the application. The information processing apparatus according to the second embodiment of the present invention can be employed to the image processing apparatus.

Third Embodiment

A description is now given of a third embodiment of the present invention. According to the third embodiment, the information processing apparatus of each of the first and second embodiments is applied to an image processing apparatus.

Figure 12:
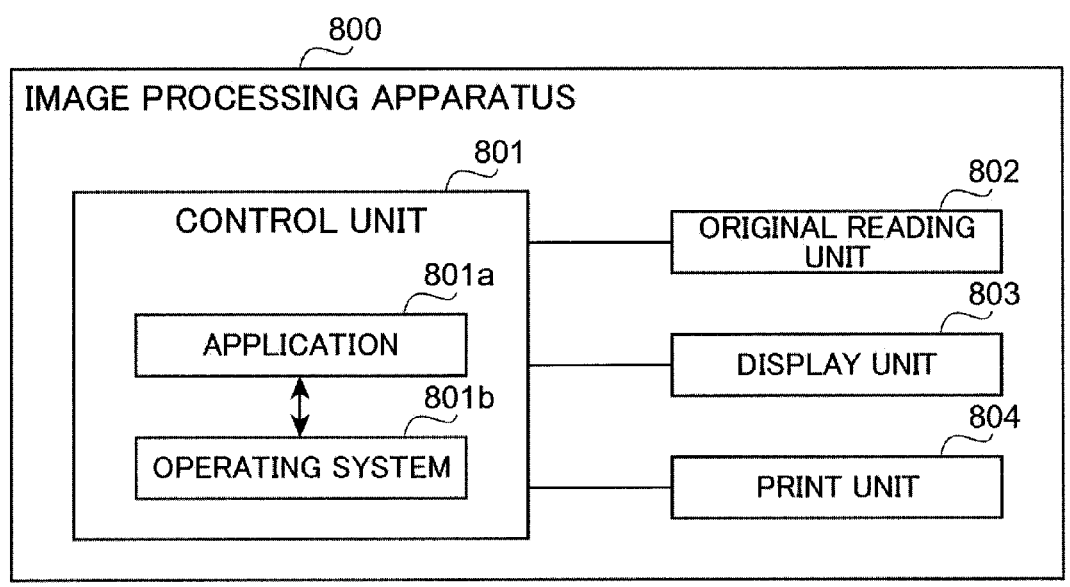
FIG. 12 is a schematic diagram illustrating an image processing apparatus according to a third embodiment of the present invention.
Figure 13:
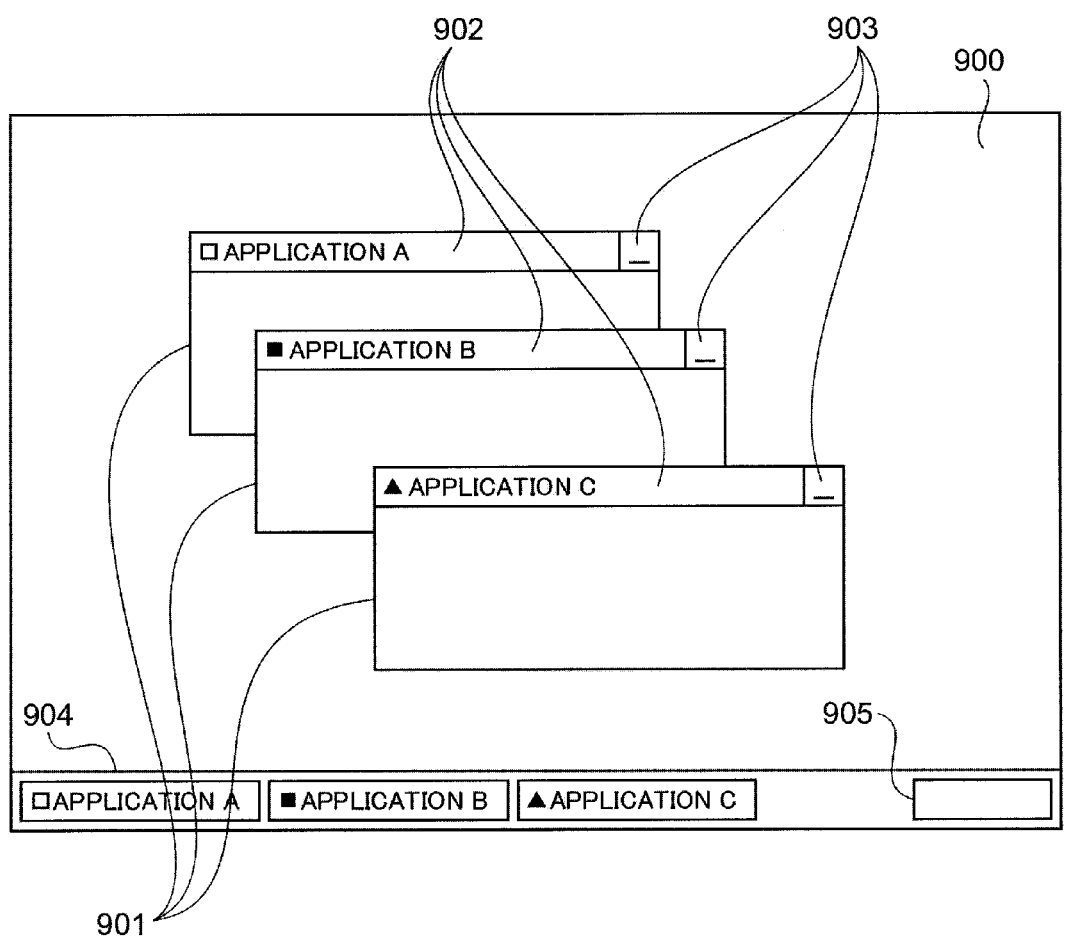
FIG. 13 is a prior art example display screen.
Figure 14:
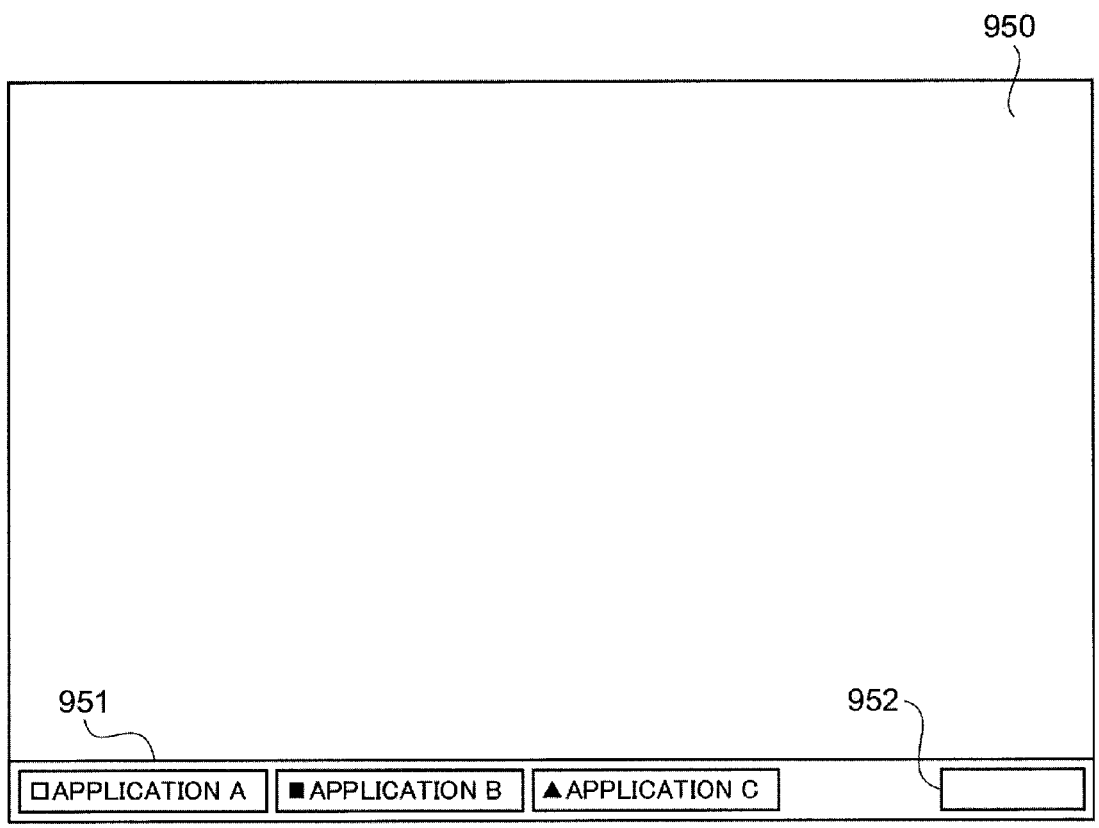
FIG. 14 is another prior art example display screen.

Referring to FIG. 12, an image processing apparatus 800 according to the third embodiment of the present invention is illustrated. The image processing apparatus 800 includes: a control unit 801 controlling the image processing apparatus 800 as a whole; an original reading unit 802; a display unit 803; and a print unit 804. The original reading unit 802 reads image data of an original based on the control by the control unit 801 and transmits the image data to the control unit 801. The display unit 803, based on the control by the control unit 801, not only displays a print condition, an operable condition, and the like with respect to a user, but also receives an instruction regarding the print condition and the operable condition from the user. The print unit 804 prints the image data on a recording medium based on the control by control unit 801. The control unit 801 allows an application program 801a to run on an operating system 801b. The application program 801a can operate substantially similar to the application program 2 of the first embodiment in a case where the information processing apparatus 1 of the first embodiments is applied to the image processing apparatus 800 of the third embodiment of the present invention. Alternatively, the application program 801a can operate substantially similar to the application program 600 of the second embodiment in a case where the information processing apparatus of the second embodiments is applied to the image processing apparatus 800 of the third embodiment. Like components will be given the same reference numerals as above embodiments, and description thereof will be omitted for the sake of simplicity.

According to the third embodiment of the present invention, therefore, the image processing apparatus 800 can include the control unit 801 and operate based on the application program 801a running on a prescribed operating system 3. The control unit 801 can function as: plural functional processing units 20a, 20b, 20c; a window processing unit 21 allowing the window with respect to the functional processing units operated to be open on the operating system 3 in a case where any of the functional processing units 20a, 20b, 20c is operated; a minimization unit 22 minimizing the window; and a setting selection unit 23 selecting the setting information for the minimization. The minimization unit 22 minimizes the window based on the setting information selected by the setting selection unit 23. The setting selection unit 23 is capable of selecting the setting information with respect each of the functional processing units 20a, 20b, 20c.

Alternatively, according to the third embodiment of the present invention, the image processing apparatus 800 can include the control unit 801 and operate based on the application program 801a running on the prescribed operating system 3. The control unit 801 can alternatively function as: plural functional processing units 601a through 601n; plural functional process time measurement units 602a through 602n measuring the time from the beginning of the operation to the end of the operation of the respective functional processing units 601a through 601n; a window processing unit 603 allowing the window with respect to the functional processing units 601a through 601n operated to be open on the operating system 3 in a case where any of the functional processing units 601a through 601n is operated; a minimization unit 604 minimizing the window; and a setting selection unit 605 capable of selecting the setting information for the minimization. The minimization unit 604 minimizes the window based on the setting information selected using the setting selection unit 605. The setting selection unit 605 can also allow a screen as illustrated in FIG. 10 to be displayed to receive the input of a threshold time to change the minimization method. The minimization unit 604 minimizes the window based on the threshold time input using the setting selection unit 605 and the operation times of the functional processing units 601a through 601n measured by the respective functional process time measurement units 602a through 602n.

Therefore, the minimization mechanism is proved to set the minimization method with respect to each of the functions in operation under the control by the control unit 801, so that the minimization is appropriately performed with respect to the function in operation.

The information processing apparatus according to each of the above embodiments can be generally applied to an electronic device. Specifically, the information processing apparatus according to each of the above embodiments can be applied to an image processing apparatus such as a multi-functional peripheral (MFP).

As can be appreciated by those skilled in the art, numerous additional modifications and variation of the present invention are possible in light of the above-described teachings. It is therefore to be understood that, within the scope of the appended claims, the disclosure of this patent specification may be practiced otherwise than as specifically described herein.

What is claimed is:

1. An image processing apparatus operating based on an application program operating on a prescribed operating system, the image processing apparatus comprising:
a control unit, based on the application program, functioning as a plurality of functional processing units;
a window processing unit allowing a window corresponding to any of the functional processing units operated in a case where any of the plural functional processing units is operated;
a minimization unit minimizing the window; and
a setting selection unit capable of selecting setting information for the minimization with respect to each of the plural functional processing units,
wherein the minimization unit minimizes the window based on the setting information selected by the setting selection unit,
wherein the setting selection unit includes a setting screen having a minimization selection button and a prescribed minimization determination button, the minimization selection button, allowing a minimization method for a first function to be designated, used to minimize the window corresponding to any of the functional processing units and capable of minimizing the window in operation in a task bar or in a system tray and the prescribed minimization determination button allowing a prescribed value for the setting information to be designated for a second function for which a minimization method cannot be designated by the minimization button,
wherein the prescribed value is used to preselect the task bar or the system tray to minimize the window corresponding to any of the functional processing units,
wherein the minimization unit minimizes each window corresponding to the first function by the minimization method designated for each first function using the minimization selection button after receiving a first function minimization instruction; and
wherein, in a case where the prescribed minimization determination button is set, the minimization unit minimizes the window corresponding to the second function based on the prescribed value after receiving a second function minimization instruction.

2. The image processing apparatus according to claim 1, wherein the control unit further functions as a functional process time measuring unit measuring a time from a beginning of operation to an end of the operation of each of the plural functional processing units,
wherein the setting selection unit is capable of receiving an input of a time to change the setting information, and
wherein the minimization unit minimizes the window based on the operation time of the functional processing unit measured by the functional process time measuring unit and the time input by the setting selection unit.

3. The image processing apparatus according to clam 2, wherein the minimization unit minimizes the window in a system tray.

4. The image processing apparatus according to clam 1,
wherein the setting information is selection information used to determine whether to minimize the window in a task bar or a system tray, and
wherein the minimization unit minimizes the window in the task bar or the system tray based on the setting information selected by the setting selection unit.

5. The image processing apparatus according to claim 1, wherein the first function is used to set the printer information or monitor the printer status.

6. The image processing apparatus according to claim 1, wherein the second function is used to transmit the data to the printer.

7. The image processing apparatus according to claim 1, wherein the prescribed value is used to preselect only the task bar to minimize the window under default.

8. An image processing apparatus operating based on an application program operating on a prescribed operating system, the image processing apparatus comprising:
a control unit, based on the application program, functioning as a plurality of functional processing units;
a window processing unit allowing a window corresponding to any of the functional processing units operated in a case where any of the plural functional processing units is operated;
a minimization unit minimizing the window; and
a setting selection unit capable of selecting setting information for the minimization with respect to each of the plural functional processing units,
wherein the minimization unit minimizes the window based on the setting information selected by the setting selection unit,
wherein the setting selection unit includes a setting screen having a minimization selection button used to minimize the window corresponding to any of the functional processing units capable of minimizing the window in a task bar or in a system tray in operation and a priority minimization determination button and
wherein the priority minimization determination button allows setting information to be prioritized over other setting information in a case where not only the plural functions are in operation, but also the setting information for the respective functions are different, and allows the setting information in the system tray to be prioritized in a case where the respective functions are in operation,
wherein the minimization unit minimizes the window designated by the priority minimization determination button regardless of the minimization method according to the setting information,
wherein, in a case where the priority minimization determination button is set, if the minimization methods designated with respect to each of the plural functions are different, the plural functions are minimized respectively based on the setting information after receiving an instruction for minimizing the plural functions which minimization method can be designated using the minimization selection button.

9. The image processing apparatus according claim 8, wherein the control unit further functions as a functional process time measuring unit measuring a time from a beginning of operation to an end of the operation of each of the plural functional processing units, wherein the setting selection unit is capable of receiving an input of a time to change the setting information, and wherein the minimization unit minimizes the window based on the operation time of the functional processing unit measured by the functional process time measuring unit and the time input by the setting selection unit.

10. The image processing apparatus according to clam 9, wherein the minimization unit minimizes the window in a system tray.

11. The image processing apparatus according to clam 8, wherein the setting information is selection information used to determine whether to minimize the window in a task bar or in a system tray, and wherein the minimization unit minimizes the window in the task bar or in the system tray based on the setting information selected by the setting selection unit.

12. The image processing apparatus according to claim 8, wherein the minimization unit minimizes the window in the system tray based on the setting information initially set.

\* \* \* \* \*